United States Patent [19]
Kurzrok

[11] 3,783,516
[45] Jan. 8, 1974

[54] NAVIGATION DEVICE
[76] Inventor: Nathan Kurzrok, 40 Candy Ln., Great Neck, N.Y.
[22] Filed: May 17, 1971
[21] Appl. No.: 143,902

[52] U.S. Cl.............................. 33/1 SD, 33/107 CB
[51] Int. Cl. ............................................ G01b 5/24
[58] Field of Search.................... 33/1 SD, 1 R, 1 C, 33/76 VA, 107 CB; 35/62; 24/67.7, 67.5; 108/93, 65

[56] References Cited
UNITED STATES PATENTS

| | | | |
|---|---|---|---|
| 1,332,835 | 3/1920 | Hewitt ............................. | 108/65 X |
| 3,185,114 | 5/1965 | Consin ............................. | 108/93 X |
| 3,065,668 | 11/1962 | Leybourn et al. ................ | 24/67.7 X |
| 1,934,528 | 11/1933 | Faries ............................. | 24/67.5 X |
| 2,114,652 | 4/1938 | Dalton ............................. | 33/1 SD |
| 3,540,127 | 11/1970 | Kane ............................... | 33/1 SD |
| 2,891,326 | 6/1959 | Fransson.......................... | 35/62 |

FOREIGN PATENTS OR APPLICATIONS

| | | | |
|---|---|---|---|
| 7,604 | 5/1915 | Great Britain.................. | 33/107 CB |

Primary Examiner—William D. Martin, Jr.
Attorney—Philip G. Hilbert

[57] ABSTRACT

A navigation device which includes map holding means and a position indicator, together with a plurality of mounted and mountable navigation aids. Such device is of a construction whereby the aids may be interchanged and used individually or in combination to suit varied navigational requirements and lending itself to single handed manual operation.

5 Claims, 6 Drawing Figures

INVENTOR.
Nathan Kurzrok

BY Philip S. Hilbert

ATTORNEY

NAVIGATION DEVICE

BACKGROUND OF THE INVENTION

In the operation of a plane, car, boat or other vehicle, reference must frequently be made to maps simultaneously with the operation of such vehicle. Further, various navigational aids may be utilized in conjunction with such maps, while the vehicle is in operation.

It follows that map holding means and associated navigational aids must be of a character such that the use thereof does not unduly interfere with the normal operation and control of the vehicle.

Accordingly, an object of this invention is to provide improved map holding means and means for detachably and interchangably mounting varied navigational aids thereon for use in conjunction with the map holding means or independently thereof, as may be necessary.

Another object of this invention is to provide a device of the character described which includes an element of the map holding means which also may be aligned with a selected path of travel on the map and which is operatively related to selected navigational aids.

Yet a further object of this invention is to provide a device of the character described, wherein selected navigational aids may be quickly mounted thereon and lend themselve to easy manipulation while the operator is engaged in the operation and control of the vehicle.

Still another object of this invention is to provide a device of the character described, wherein the map holder readily accomodates a map in folded condition, holds the same against shift or other undesirable movements engendered by wind or motions of the vehicle, and allows for ready focusing of the eyes of the user in respect to various significant points on the map.

Yet another object of this invention is to provide a device of the character described, which includes computing and measuring means, which may be related to selected paths set forth on the map; such means lending itself to simple and convenient manual operation.

Still a further object of this invention is to provide a device of the character described, which is compact and of light weight, thereby facilitating change of position, manipulation thereof and interchange of navigational aids for mounting thereon; all with a single hand.

Other objects of this invention will in part be obvious and in part hereinafter pointed out.

DESCRIPTION OF THE PREFERRED EMBODIMENTS

Figure 1:
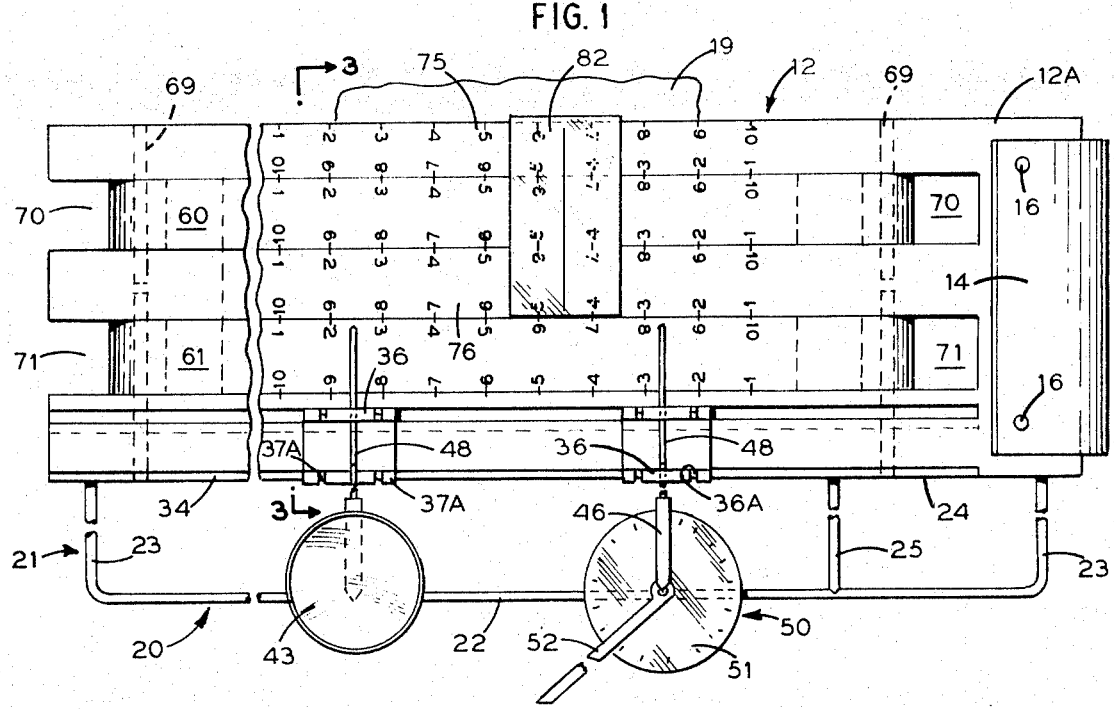
FIG. 1 is a top plan view of a navigation device embodying the invention.
Figure 2:
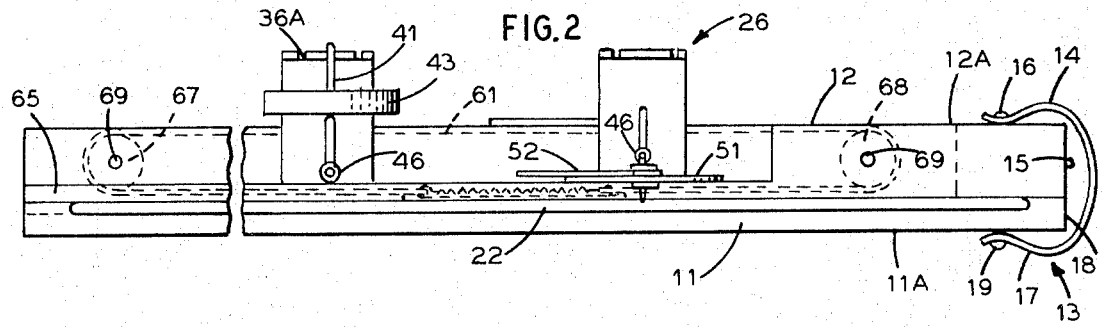
FIG. 2 is afront elevational view thereof.
Figure 3:
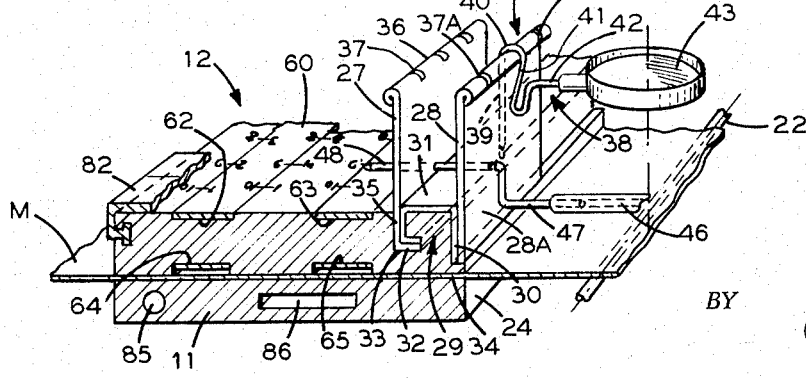
FIG. 3 is a perspective view of a portion of the device.

As shown in FIG. 1, 10 designates a navigation device embodying the invention. The same comprises a pair of elongated members 11, 12 arranged in superposed relation. Members 11, 12 may be formed of plastic, wood or the like. Member 11 constitutes a base and member 12 is held in resilient, clamping relation to base member 11 by a U shaped spring member 13. The arm 14 of spring member 13 is secured to a top surface portion 12A of top member 12, adjacent one end 15 thereof, by rivets 16. The other arm 17 of spring member 13 is secured to a bottom surface portion 11A of base member 11 adjacent end 18 thereof by rivets 19.

Thus, a map M in conveniently folded form, maybe placed between members 11, 12 to present selected portions of the map for ready reference by the user, yet allowing the map to be shifted laterally with respect to members 11, 12, as desired. Map support means 20 is mounted on base member 11 for supporting extended portions of map M in a horizontal plane coextensive with that of the top surface of the base member.

Map support means 20 comprises a wire member 21 having a longitudinally extending long arm portion 22 and transversely extending short end arm portions 23 fixed in the forward edge 24 of base member 11. An intermediate short arm portion 25 extends from long arm portion 22 and is embedded in base edge 24.

Thus, long arm portion 22 extends parallel to base edge 24 and together with short arm portions 23, 25 provides means for supporting the extended forward portion of map M for easy reference. The spacing of long arm portion 22 from base edge 24 is related to the mounting of various navigational aids as hereinafter described.

It will be apparent that map M is readily shifted to selected positions by slight displacement of the resiliently biased members 11, 12 to allow for movement of map M, and regripping of the map M in its shifted position. By aligning a drawn path on map M with long arm portion 22, such path is colinear and related to various navigational aids as hereinafter described.

The device 10 further includes means for mounting thereon selected navigational aids. To this end thereis provided clips 26 which are of modified H shaped cross section. Clip 26 comprises upstanding, opposed portions 27, 28 which are held in spaced relation by a channel member 29. Member 29 comprises a depending arm portion 30 which abuts and is fixed to the inner surface of portion 28A of portion 28, at the lower end thereof.

Member 29 further includes a horizontal portion 31 extending from a vertical portion 30, and terminates in a depending angular portion 32 which abuts a lower angular portion 33 of clip portion 27 and is fixed thereto.

Clips 26 are slidably mounted on member 12. To this end, the edge of member 12 is rabetted as at 34 along the length thereof to receive therein the clip portions 28A, 30. Member 12 is further formed with a longitudinally extending L shaped groove 35 for slidably receiving therein attached portions 32, 33 of clip 26. The top edges of clip portions 27, 28 are rolled as at 36, 36A; the rolled edges being slotted as at 37, 37A. The clips are of a sturdy, resilient construction and readily moved in or removed from, the groove 35 and rabbet 34.

Carrier means 38 is provided for mounting selected navigation aids on clips 26. Means 38 is formed of spring wire, plastic or the like; and is removably mounted on edge 36A in slot 37A thereof. Means 38 comprises a depending long arm 39, a bight portion 40, a short arm 41 which terminates in a forwardly extending angular portion 42; the bight portion 40 being received in a slot 37A.

By way of example, a magnifying glass 43 is coupled to carrier portion 42, the center of magnifying glass 43 being aligned with long arm portion 22 of map support means 20. A pointer 46 of tubular form, is coupled to the forward end of an angle wire member 47. The rearwardly extending portion 48 of member 47 is mounted on clip portions 27, 28 by way of aligned openings therein; the portion 48 abutting clip portion 31. The rearwardly extending portion 48 provides pointer means for the purpose hereinafter described. The forward end of pointer 46 is vertically aligned with the center of magnifying glass 43.

Figure 6:
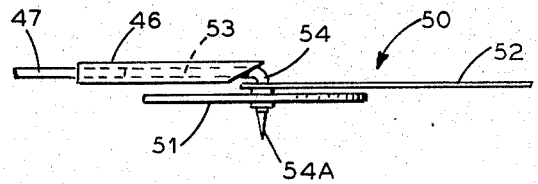
FIG. 6 is a side elevational view showing details of one navigational aid.

Further, by way of illustration, a navigation aid in the form of an azimuth measuring device 50 may be mounted on the forward end of tubular pointer 46. As shown in FIGS. 1, 6, device 50 comprises a circular disc 51 carrying bearing indicia, and the pivoted pointer 52. Device 50 is coupled to pointer 46 by a wire arm member 53. Arm member 53 terminates at its forward end in a depending arm 54 on which disc 51 and pointer 52 are mounted.

The center of azimuth disc 51 is always directly aligned with long arm portion 22 of map holder 20. A pin 54A extending from short arm 54 pierces the map M allowing rotation thereof as well as pointer 52, about the defined given point on map M, thereby facilitating the plotting of and drawing of a bearing from such reference point.

Device 10 is further provided with measuring and calculating means. To this end, suitable scale means are provided in the form of endless scale bands 60, 61 movable longitudinally of the device, together with fixed scales 75, 76. Bands 60, 61 are mounted on member 12 by way of upper slots 62, 63 and lower slots 64, 65. The opposite end portions of bands 60, 61 are mounted on rollers 67, 68 having shaft portions 69 spanning slotted portions 70, 71 at the opposite ends of member 12.

Bands 60, 61 may be replaced as desired. To this end, the opposite ends 60A, 61A of said bands are interconnected by spring members 72 which are protected by flexible cover elements 73. Indicia are applied to the top surface portions of fixed scales 75, 76. The indicia may also be applied in reversed scales to permit readings from either end of device 10, in accordance with the position of the device as it is held by the user. The pointer 48 extends over indicia band 61 to allow for suitable measurements.

Figure 4:
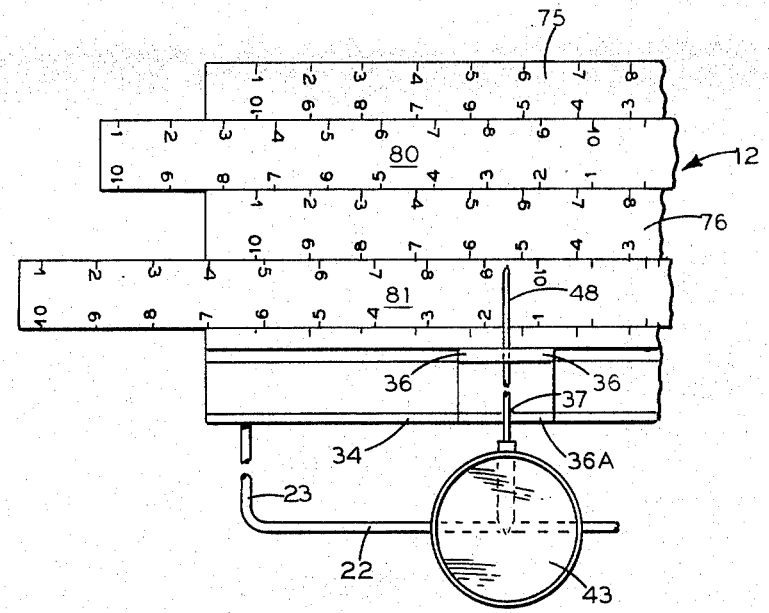
FIG. 4 is a top plan view showing a modified form of the calculating means, forming a portion of the device.
Figure 5:
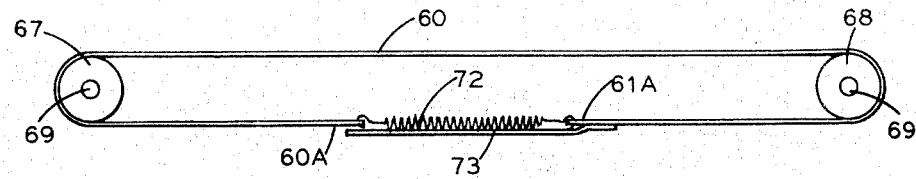
FIG. 5 is a side elevational view showing the calculating means in the form of endless bands.

Alternatively, as shown in FIG. 4, endless bands 60, 61, may be replaced by slidable members 80, 81 arranged for movement in suitable slots formed in the top surface of member 12. Such members 80, 81 may be used in conjunction with scales 75, 76 for slide rule type computations, aided by the usual runner 82.

It is understood that various other navigation aids, including illuminating means, not shown, may be suitably mounted by way of coupling pointers 46 or by carrier means 38. to locate the same in proper relation to the map M supported on means 20. Further, the base member 11 may be provided with various recesses 85, 86 of suitable configuration and size, to receive sundry accessories of use for navigational purpose.

I claim:

1. A navigation device comprising map holder means, said map holder means comprising a pair of superposed elongated members, means for resiliently interconnecting said members at one end thereof to grip map means therebetween, said members being displaceable to allow for the shift of the intervening map means to present selected portions thereof for viewing, means extending laterally from one of said members for supporting laterally projecting portions of said map means, said supporting means comprising a U shaped wire member having a pair of arms projecting outwardly from an edge of the lowermost of said members and an elongated arm connecting the outer ends of said pair of arm and extending outwardly of the lowermost of said members, and clip means slidably mounted on the uppermost of said pair of members, and means on said clip means for detachably mounting navigation aid means thereon.

2. A device as in claim 1, wherein said clip means comprises a pair of opposed upstanding portions, spacer means interconnecting said upstanding portions, and a pair of opposed depending portions engageable with said uppermost member.

3. A device as in claim 2, wherein the forward edge of said uppermost member is recessed along the length thereof to receive the forwardly disposed depending portion of said clip means, said uppermost member being further formed with longitudinally extending groove means for receiving therein the rearwardly disposed depending portion of said clip means.

4. A device as in claim 1, wherein the mounting means on said clip means comprises tubular pointer means, said navigation aid means including stem portions receivable in said tubular pointer means.

5. A device as in claim 2 and further including carrier means detachably mounted on the top edge of one of the upstanding portions of said clip means, and coacting means on said carrier means and the top edge of said upstanding clip portion for retaining said carrier means against lateral movement relative to said clip means.

* * * * *